United States Patent
Schultz et al.

(10) Patent No.: US 9,902,863 B2
(45) Date of Patent: Feb. 27, 2018

(54) MIXTURES, METHODS AND COMPOSITIONS PERTAINING TO CONDUCTIVE MATERIALS

(71) Applicant: BASF SE, Ludwigshafen (DE)

(72) Inventors: David Schultz, La Jolla, CA (US); James Glass, Cardiff By The Sea, CA (US); Benjamin W. C. Garcia, San Diego, CA (US)

(73) Assignee: BASF SE, Ludwigshafen (DE)

( * ) Notice: Subject to any disclaimer, the term of this patent is extended or adjusted under 35 U.S.C. 154(b) by 9 days.

(21) Appl. No.: 15/234,310

(22) Filed: Aug. 11, 2016

(65) Prior Publication Data

US 2016/0369112 A1 Dec. 22, 2016

Related U.S. Application Data

(63) Continuation of application No. 13/843,271, filed on Mar. 15, 2013, now Pat. No. 9,441,117.

(60) Provisional application No. 61/613,432, filed on Mar. 20, 2012.

(51) Int. Cl.

| | |
|---|---|
| C09D 5/26 | (2006.01) |
| C09D 5/24 | (2006.01) |
| C09D 101/26 | (2006.01) |
| C09D 7/00 | (2018.01) |
| C09D 7/12 | (2006.01) |
| H01B 1/22 | (2006.01) |
| C09D 101/28 | (2006.01) |
| C09D 129/14 | (2006.01) |
| C09D 133/12 | (2006.01) |
| C09D 139/06 | (2006.01) |
| C09K 5/08 | (2006.01) |
| C08K 7/06 | (2006.01) |
| C08K 3/08 | (2006.01) |

(52) U.S. Cl.
CPC ............... *C09D 5/26* (2013.01); *C09D 5/24* (2013.01); *C09D 7/001* (2013.01); *C09D 7/1291* (2013.01); *C09D 101/26* (2013.01); *C09D 101/28* (2013.01); *C09D 129/14* (2013.01); *C09D 133/12* (2013.01); *C09D 139/06* (2013.01); *C09K 5/08* (2013.01); *H01B 1/22* (2013.01); *C08K 7/06* (2013.01); *C08K 2003/0806* (2013.01); *C08K 2201/001* (2013.01); *C08K 2201/011* (2013.01); *Y10T 428/25* (2015.01); *Y10T 428/31678* (2015.04); *Y10T 428/31975* (2015.04)

(58) Field of Classification Search
CPC . C09D 5/26; C09D 5/24; C09D 7/001; C09D 7/1291; C09D 101/26; C09D 101/28; C09D 101/30; C09D 101/32; H01B 1/22; H01B 1/20; H01B 1/16; H01B 1/14
See application file for complete search history.

(56) References Cited

U.S. PATENT DOCUMENTS

| | | |
|---|---|---|
| 3,755,723 A | 8/1973 | Short |
| 3,903,328 A | 9/1975 | Burdette, Jr. |
| 4,419,279 A | 12/1983 | Abrams |
| 5,126,915 A | 6/1992 | Pepin |
| 5,250,229 A | 10/1993 | Hara |
| 5,543,096 A | 8/1996 | Wu |
| 7,062,848 B2 | 6/2006 | Pan et al. |
| 7,097,788 B2 | 8/2006 | Kilkor et al. |
| 7,727,578 B2 | 6/2010 | Guiheen et al. |
| 8,018,568 B2 | 9/2011 | Allemand |
| 8,414,964 B2 | 4/2013 | Kazuyoshi |
| 9,441,117 B2 * | 9/2016 | Schultz .................. C09D 5/24 |
| 2004/0155227 A1 | 8/2004 | Bechtloff |
| 2006/0258254 A1 | 11/2006 | Nishimura et al. |
| 2008/0292979 A1 | 11/2008 | Ding et al. |
| 2009/0029057 A1 | 1/2009 | Brown |
| 2009/0188556 A1 | 7/2009 | Castillo |
| 2009/0223703 A1 | 9/2009 | Winoto |
| 2009/0258202 A1 | 10/2009 | Sakaguchi |
| 2009/0258241 A1 | 10/2009 | Shiraishi |
| 2009/0283304 A1 | 11/2009 | Winoto |
| 2010/0136224 A1 | 6/2010 | Britz |
| 2010/0242679 A1 | 9/2010 | Yi-Hsiuan et al. |
| 2010/0275814 A1 | 11/2010 | Rogers |
| 2011/0062389 A1 | 3/2011 | Wang et al. |
| 2012/0126183 A1 | 5/2012 | Hosoi |
| 2012/0174978 A1 | 7/2012 | Lonkin |
| 2012/0217453 A1 | 8/2012 | Lowenthal |
| 2013/0258568 A1 | 10/2013 | Iwata et al. |
| 2015/0065548 A1 | 3/2015 | Adden |

FOREIGN PATENT DOCUMENTS

| | | |
|---|---|---|
| CN | 101006525 | 7/2007 |
| CN | 101287566 A | 10/2008 |

(Continued)

OTHER PUBLICATIONS

Combined Chinese Office Action and Search Report dated Aug. 22, 2016 in Patent Application No. 201380026306.8 (with partial English language translation and English translation of categories of cited documents).

(Continued)

*Primary Examiner* — Andrew Q Tran

(74) *Attorney, Agent, or Firm* — Oblon, McClelland, Maier & Neustadt, L.L.P.

(57) ABSTRACT

This invention pertains to mixtures and methods that can be used to produce materials comprising an electrically and/or thermally conductive coating as well as compositions that are materials that possess an electrically and/or thermally conductive coating. The mixtures and methods can be used to fabricate transparent conductive films and other transparent conductive materials.

22 Claims, 2 Drawing Sheets

(56) References Cited

FOREIGN PATENT DOCUMENTS

| | | |
|---|---|---|
| CN | 102250506 | 11/2011 |
| JP | 2009-505358 A | 2/2009 |
| JP | 2009/283362 | 12/2009 |
| JP | 2010-525527 A | 7/2010 |
| JP | 2010-267395 A | 11/2010 |
| JP | 2011-134630 A | 7/2011 |
| KR | 10-2010-0017129 A | 2/2010 |
| KR | 10-2010-0108098 A | 10/2010 |
| KR | 10-2010-0125315 A | 11/2010 |
| RU | 2009 118 342 A | 11/2010 |
| WO | 2007/022226 | 2/2007 |
| WO | WO 2007/022226 A2 | 2/2007 |
| WO | WO 2009/017852 A2 | 2/2009 |
| WO | WO 2009/041170 A1 | 4/2009 |
| WO | 2010/110626 | 9/2010 |
| WO | 2011/008226 | 1/2011 |
| WO | WO 2011/066010 A1 | 6/2011 |

OTHER PUBLICATIONS

Combined Office Action and Search Report dated Feb. 14, 2017 in Russian Patent Application No. 2014141995/05(068013) (with English translation of categories of cited documents).

Office Action dated Jun. 15, 2017 in Russian Patent Application No. 2014141995/05(068013).

Japanese Office Action dated Jun. 6, 2017 in Japanese Patent Application No. 2015-501839 (with English translation).

Dow Cellulosics; Ethocel Ethylcellulose Polymers Technical Handbook (Sep. 2005).

Extended Search Report dated Sep. 16, 2015 in European Patent Application No. 13764213.8.

Duck-Jin Lee, et al., "Effects of additives and post-treatments on emission characteristic of carbon nanotubes field emitters by screen printing method", IMID '05, Digest, XP040420479, Jul. 1, 2005, pp. 1447-1450.

Office Action dated Dec. 29, 2015, in Chinese Patent Application No. 201380026306.8 with English translation.

\* cited by examiner

Fig. 1

TABLE II.

| Sample | % IPA | % Methanol | Toluene | % Methyl Acetate | % Acetone | % Ethyl Acetate | % MEK | Aggregation Score (2 is worst) |
|---|---|---|---|---|---|---|---|---|
| 1 - Useful | 97.5 | 0 | 0 | 2.5 | 0 | 0 | 0 | 0 |
| 2 - Non Useful | 2.5 | 0 | 0 | 2.5 | 14.5 | 18.75 | 52.5 | 1 |
| 3 - Non Useful | 37 | 0 | 0 | 2.5 | 0 | 37 | 23.5 | 2 |
| 4 - Non Useful | 10 | 0 | 0 | 2.5 | 0 | 0 | 87.5 | 1 |
| 5 - Non Useful | 2.5 | 0 | 0 | 2.5 | 95 | 0 | 0 | 2 |
| 6 - Useful | 2.5 | 95 | 0 | 2.5 | 0 | 0 | 0 | 0 |
| 7 - Non Useful | 2.5 | 0 | 0 | 2.5 | 0 | 95 | 0 | 2 |
| 8 - Non Useful | 2.5 | 0 | 0 | 2.5 | 0 | 0 | 95 | 1 |
| 9 - Non Useful | 2.5 | 0 | 0 | 97.5 | 0 | 0 | 0 | 2 |
| 10 - Non Useful | 2.5 | 0 | 95 | 2.5 | 0 | 0 | 0 | 1 |

Fig. 2

TABLE IV.

| Sample | Polymer | Solvents | | | | Surface Resistance (Ohm/sq) | % Transmission* (550 nm) |
|---|---|---|---|---|---|---|---|
| | | Alcohol | Ester | Aliphatic or Aromatic | Water | | |
| 1 - Useful | Ethyl cellulose | 95 | 5 | 0 | 0 | 212 | 87.7 |
| 2 - Non Useful | Ester cellulose | 95 | 5 | 0 | 0 | polymer unstable | not measured |
| 3 - Useful | PVB | 100 | 0 | 0 | 0 | 130 | 87.1 |
| 4 - Non Useful | PVB | 0 | 0 | 100 | 0 | polymer unstable | not measured |
| 5 - Useful | PVP | 100 | 0 | 0 | 0 | 193 | 87.3 |
| 6 - Non Useful | PVP | 0 | 0 | 100 | 0 | polymer unstable | not measured |
| 5 - Non Useful | Ethyl cellulose | 100 | 0 | 0 | 0 | polymer unstable | not measured |
| 6 - Non Useful | Methyl cellulose | 95 | 0 | 0 | 5 | polymer unstable | not measured |
| 7 - Useful | Methyl cellulose | 75 | 0 | 0 | 25 | 279 | 89 |
| 8 - Useful | Methyl cellulose | 50 | 0 | 0 | 50 | 245 | 88.1 |
| 9 - Non Useful | PS | 80 | 0 | 20 | 0 | polymer unstable | not measured |
| 10 - Non Useful | PMMA | 80 | 0 | 20 | 0 | polymer unstable | not measured |
| 11 - Useful | PMMA | 20 | 0 | 80 | 0 | 116 | 86.9 |

* includes substrate

MIXTURES, METHODS AND COMPOSITIONS PERTAINING TO CONDUCTIVE MATERIALS

CROSS REFERENCE TO RELATED APPLICATIONS

This application is a Continuation of U.S. Non-Provisional application Ser. No. 13/843,271, which was filed on Mar. 15, 2013. This application claims the benefit of U.S. Provisional Patent Application Ser. No. 61/613,432, filed on Mar. 20, 2012; herein incorporated by reference for any and all purposes.

STATEMENT REGARDING FEDERALLY SPONSORED RESEARCH OR DEVELOPMENT

This work was supported by United States Air Force contract No. FA8650-08-C-5609.

The section headings used herein are for organizational purposes only and should not be construed as limiting the subject matter described in any way.

BRIEF DESCRIPTION OF THE DRAWINGS

The skilled artisan will understand that the drawings, described below, are for illustration purposes only. The drawings are not intended to limit the scope of the present teaching in any way.

FIG. 1 is a table containing data that describes the aggregation state of mixtures comprising silver nanowires and a polymer referred to below as EC10 dispersed in various solvents where said mixtures have been spread to create a coating on a glass slide.

FIG. 2 is a table containing data that illustrates the transparency and resistivity of mixtures comprising silver nanowires and different polymer binders dispersed in various solvents where said mixtures have been spread to create a coating on a glass slide.

All literature and similar materials cited in this application, including but not limited to patents, patent applications, articles, books and treatises, regardless of the format of such literature or similar material, are expressly incorporated by reference herein in their entirety for any and all purposes.

DESCRIPTION

1. Field

This invention pertains to the field of electrically and/or thermally conductive materials.

2. Introduction

There is currently strong interest in developing new types of electrically and/or thermally conductive films for applications such as touch panel displays, liquid crystal displays, electroluminescent lighting, organic light-emitting diodes and photovoltaic solar-cells. Current transparent electrically conductive films are generally based on Indium tin oxide (ITO). ITO based films however can be brittle and can require costly production equipment and processes. It would be useful to have alternative compositions and methods that can produce electrically and/or thermally conductive films (including transparent conductive films) that are flexible and/or capable of being produced at low cost.

3. Definitions

For the purposes of interpreting of this specification, the following definitions will apply and whenever appropriate, terms used in the singular will also include the plural and vice versa. In the event that any definition set forth below conflicts with the usage of that word in any other document, the definition set forth below shall always control for purposes of interpreting the scope and intent of this specification and its associated claims. Notwithstanding the foregoing, the scope and meaning of any document incorporated herein by reference should not be altered by the definition presented below. Rather, said incorporated document should be interpreted as it would be by the ordinary practitioner based on its content and disclosure with reference to the content of the description provided herein.

The use of "or" means "and/or" unless stated otherwise or where the use of "and/or" is clearly inappropriate. The use of "a" means "one or more" unless stated otherwise or where the use of "one or more" is clearly inappropriate. The use of "comprise," "comprises," "comprising" "include," "includes," and "including" are interchangeable and not intended to be limiting. Furthermore, where the description of one or more embodiments uses the term "comprising," those skilled in the art would understand that in some specific instances, the embodiment or embodiments can be alternatively described using language "consisting essentially of" and/or "consisting of."

As used herein, the phrase "alcohol solvent" refers to a substantially pure compound that is liquid at ambient temperature and that comprises at least one alcohol moiety. Some non-limiting examples of alcohol solvents include methanol, ethanol, isopropanol, n-propanol, n-butanol, iso-butanol and sec-butanol.

As used herein, the phrase "aliphatic solvent" refers to a substantially pure compound that is liquid at ambient temperature and that is comprised primarily of one or more hydrocarbons. Some non-limiting examples of aliphatic solvents include pentane, hexane, heptane, cyclohexane, mineral spirits and petroleum distillates.

As used herein with respect to a nanoparticle, the term "anisotropic" refers to particles that exhibit different sizes when measured in different directions. For example, nanowires have been referred to in literature as having an aspect ratio that is derived by dividing the length of said nanowire by the width of said nanowire such that the aspect ratio is greater than 10. Accordingly, the length direction of a nanowire having an aspect ratio of 10 is 10 times longer than the width direction.

As used herein, the phrase "apolar vinyl polymer" refers to a vinyl polymer that comprises primarily apolar monomeric subunits. Some non-limiting examples of apolar vinyl polymers include polyethylene, polypropylene, cyclic olefin polymer, polystyrene, polymethylmethacrylate, polymethacrylate, polyesters (polyethylene terephthalate, polybutylene terephthalate), polyacrylonitrile.

As used herein, the phrase "aromatic solvent" refers to a substantially pure compound that is liquid at ambient temperature and that comprises primarily one or more benzene ring moieties. Some non-limiting examples of aromatic solvents include benzene, toluene, xylene, ethyl benzene and mineral spirits.

As used herein, the term "binder" refers to a compound or combination of compounds that supports a network (or web or matrix) of interconnected anisotropic conductive nanoparticles that is left behind when solvent of the mixture evaporates to form a film, gel or semi-solid layer on a substrate. Some examples of binders used in the practice of various embodiments of this invention include cellulose ethers, polar vinyl polymers, apolar vinyl polymers and water soluble polymers.

As used herein, the phrase "cellulose ether" refers to a cellulose polymer that comprises at least one ether moiety within monomeric subunits that comprise said polymer. In some embodiments, the 'cellulose ether' may contain primarily ether groups. The cellulose ether generally does not contain even a single ester group.

As used herein, the term "coating" (as a noun) refers to the resulting film formed by application of a mixture to a surface. In some embodiments, the terms "coating" (as a noun) and "layer" can be used synonymously to thereby refer to the resulting film formed by application of a mixture to a surface. In some embodiments the resulting film can be a liquid, with suspended nanoparticles uniformly dispersed therein. In some embodiments, the film can be a solid formed by evaporation of solvent from the mixture. As used herein "coating" (as a verb) refers to the act of applying a mixture to a surface to thereby form a film.

As used herein, the term "conductive" refers to possessing the property of conductivity, wherein said conductivity can be electric conductivity and/or thermal conductivity.

As used herein, the phrase "conductive layer" refers to a layer or coating (or in some cases a plurality of disposed layers) disposed on a substrate wherein the layer is electrically conductive and/or thermally conductive. In some embodiments said conductive layer can be a liquid. In some embodiments said conductive layer can be a solid, semi-solid or gel. In brief, the 'conductive layer' formed by practice of this invention can be a network (or mesh) of anisotropic conductive nanoparticles disposed on a substrate where said network of anisotropic conductive nanoparticles is at least partially encapsulated in a binder.

As used herein, the phrase "conductive polymer" refers to a polymer that when cast on a substrate produces a conductive layer. Some non-limiting examples of conductive polymers are polythiophene and its derivatives, polyaniline, poly(3,4-ethylenedioxythiophene), poly(p-phenylene vinylene), polypyrrole, polyacetylene, or mixtures thereof. It is to be understood that a 'conductive polymer' need not comprise anisotropic conductive nanoparticles to be conductive.

As used herein, the phrase "electrically conductive" refers to possessing the ability to conduct electricity.

As used herein, the phrase "ester solvent" refers to a substantially pure compound that is liquid at ambient temperature and that comprises at least one ester moiety. Some non-limiting examples of ester solvents are methyl acetate, ethyl acetate, n-propyl acetate, isopropyl acetate, methyl propionate and ethyl propionate.

As used herein, the term "film" refers to a covering (e.g. a 'conductive layer') that may be thin relative to the surface on which it is disposed.

As used herein, the phrase "ketone solvent" refers to a substantially pure compound that is liquid at ambient temperature and that comprises at least one ketone moiety. Some non-limiting examples of ketone solvents include acetone, methyl ethyl ketone, methyl propyl ketone, methyl isobutyl ketone, methyl isoamyl ketone, diacetone alcohol, methyl amyl ketone, cyclohexanone, di-isobutyl ketone and isoporone.

As used herein, the term "layer" can be used synonymously with the term 'coating' to thereby refer to the resulting film formed by application of a mixture to a surface. In some embodiments the resulting film can be a liquid, with suspended nanoparticles uniformly dispersed therein. In some embodiments, the film can be a solid formed by evaporation of solvent from the mixture.

As used herein, the term "mixture" refers to the product formed by combining (i.e. mixing) reagents and solvents as described herein. In some embodiments of this invention, a mixture can comprise at least anisotropic conductive nanoparticles, a binder, an alcohol solvent and an ester solvent. In some embodiments, a mixture may also be a solution.

As used herein, the term "nanoparticle" refers to a particle having at least one dimension that is the range from between 1 nanometer and 999 nanometers in length.

As used herein, "photo-patterned polymer" refers to a material that can be deposited as a continuous layer on a surface and cured in areas that are irradiated by electromagnetic radiation, lasers, or electron beams. These are typically called photoresist materials in the fabrication of integrated circuits and are patterned using standard patterning methods. The electromagnetic radiation is typically in the ultraviolet (UV) range.

As used herein, the phrase "polar vinyl polymer" refers to a vinyl polymer that comprises at least one polar moiety within monomeric subunits that comprise said polymer. Some non-limiting examples of polar vinyl polymers include polyvinylpyrrolidone (PVP), polyvinylbutyral (PVB), polyvinylalcohol (PVA), polyvinylacetate and polyacrylic acid.

As used herein, the term "solid" is generally intended to distinguish a liquid mixture from the 'solid' material that remains after solvent from the liquid mixture has evaporated. The term "solid" also can be used with reference to reagents that are in 'solid' form when obtained for preparation of a mixture as described herein. The term 'solid' is not intended to suggest that the material is brittle or inflexible. Indeed, in many embodiments, the 'solid' conductive layer that remains can be quite flexible after mixtures of this invention have been applied to a substrate and solvents in said mixture have been allowed to evaporate. The term 'solid' is also not intended to exclude situations where the solid compound is, for example, suspended in a liquid.

As used herein, the term "stencil" refers to a masking layer as either a free standing film or patterned layer on a surface.

As used herein, the term "surfactant" refers to a substantially pure compound that is amphiphilic and comprises at least one polar moiety and at least one apolar moiety. The surfactant can be either ionic or non-ionic in nature. Some non-limiting examples of ionic surfactants include sodium lauryl sulfate (SDS), ammonium lauryl sulfate, perfluorooctanesulfonate, sodium stearate, fatty acid salts and cetyltrimethylammonium bromide (CTAB). Some non-limiting examples of non-ionic surfactants include cetyl alcohol, stearyl alcohol, polyoxyethylene glycol alkyl ethers, polyoxypropylene glycol alkyl ethers, polyethylene oxide-block-propylene oxide copolymers and fluoropolymer-block-polyethylene oxides.

As used herein, the term "substrate" refers to a base material. Substrates used in the practice of this invention can be transparent materials such as glass or transparent polymer materials. Generally the 'substrate' will be transparent, semi-transparent or opaque. However the 'substrate' need not always be capable of transmitting light.

As used herein, the term "transparent" refers to a property of a material (e.g. a substrate or a conductive layer) whereby said material permits transmission of at least 50% of the light directed to one side of said material through to the other side of said material.

As used herein the phrase "thermally conductive" refers to possessing the ability to conduct heat.

As used herein with respect to a mixture, the term "uniform" refers to the situation where solid components of said mixture are substantially homogeneously dispersed throughout said mixture such that there is little or no detectable swelling, localization, clumping or aggregation of any undissolved solids that remain in said mixture.

As used herein, the phrase "water soluble polymer" refers to a polymer that comprises primarily polar monomeric subunits that render the polymer soluble in water. Some non-limiting examples of water soluble polymers that can be used in the practice of this invention include carboxymethyl cellulose, hydroxyethyl cellulose, hydroxypropyl methyl cellulose, methyl cellulose, polyvinyl alcohol (PVA), polystyrene sulfonate, polyallylamine, polyethyleneimine (PEI), poly(2-ethyl-2-oxazoline), polyethylene oxide, polyethlyene glycol, polyvinylpyrrolidone and combinations thereof.

As used herein with respect to a mixture, the phrase "weight percent" refers to the weight of one component or a select number of components of said mixture as it/they relates/relate to the weight of all components of said mixture.

4. General

It is to be understood that the discussion set forth below in this "General" section can pertain to some, or to all, of the various embodiments of the invention described herein.

Substrate

According to various embodiments of this invention, a conductive layer is formed and/or deposited on a substrate. The substrate can be transparent. The substrate can be semi-transparent. The substrate can be opaque. The substrate can be a material that combines two or more of these features at different locations of the substrate. One or more sections of the substrate may be non-transparent or may even reflect light. In many cases, the substrate is transparent or semi-transparent.

The substrate can be a rigid material such as glass, polycarbonate, polyester, acrylic or combinations thereof. The substrate can be a flexible film such a film made from poly(ethylene terephthalate) (PET), poly(ethylene napthalate) (PEN) or thermoplastic polymers such as polyvinylidene difluoride (PVDF) or polytetrafluoroethylene (a.k.a. TEFLON) or combinations of any of the foregoing. The substrate can be made of other polymers such as acrylates, methacrylates, polyolefins, polystyrenes or combinations or copolymers thereof. The substrate can be made of many different materials or from layers of various different materials. The substrate may be treated or annealed to reduce shrinkage and/or to promote stability.

Conductive Layer

In embodiments of this invention, a 'conductive layer' is formed and/or deposited on the substrate. The conductive layer is thermally conductive and/or electrically conductive. In general the conductive layer can be formed by contacting the substrate with a mixture as described in more detail below. Said mixture can be a liquid, paste or gel that can be applied to the substrate to thereby form a film (a.k.a. coating or layer). Said mixture comprises anisotropic conductive nanoparticles as described in more detail below. Said anisotropic conductive nanoparticles are present in said mixture such that when deposited on the substrate they form a network of particles that is capable of transmitting electricity and/or heat across said 'conductive layer'.

It is to be understood that in some embodiments, the 'conductive layer' can comprise more than one 'layer' of material that is deposited on the substrate. Stated differently, in some embodiments the mixture can be applied in more than one application or by the (layer-on-layer) sequential application of two or different mixtures. Indeed, in some embodiments the conductive properties of the resulting 'layer' or 'film' (i.e. the final 'conductive layer') can be adjusted or tuned based on the number of layers of mixture and/or the composition of the various layers of mixture that is applied to the substrate. Consequently, what is referred to as the 'conductive layer' can in some cases comprise a plurality of distinct layers that have been applied to the substrate to thereby form a conductive network on at least part of at least one surface of the substrate.

In some embodiments the 'conductive layer' completely covers a surface of the substrate. In some embodiments, the 'conductive layer' covers only a portion of one or more surfaces of the substrate. In some embodiments, the 'conductive layer' can be applied to the substrate to form a two or three dimensional pattern. In some embodiments, multiple layers can be applied to the substrate, some of which may be formed from non-conductive materials. For example, a first 'conductive layer' could be applied to the substrate in a pattern, a non-conductive layer could then be applied in a pattern over said substrate and at least part of said first 'conductive layer' and then a second 'conductive layer' could be applied (optionally in a pattern) over the said substrate and at least part of said non-conductive layer and at least part of said first conductive layer such that there is at least partial contact between parts of the first and second 'conductive layers'. This process could be repeated multiple times to thereby produce complex patterned interconnected conductive network or networks in two or three dimensions.

Patterned conductive layers can also be formed by, for example, first depositing a non-conductive layer, wherein the anisotropic conductive nanoparticles are deposited with a non-conductive binder, resin or additive that inhibits conduction between the anisotropic conductive nanoparticles. An example of an non-conductive binder, resin or additive that would inhibit conduction between individual anisotropic conductive nanoparticles is one that preferentially adheres to the surface of the conductive nanoparticles and shields said nanoparticles from conductively interacting with other nanoparticles and wherein said non-conductive binder, resin or additive can be at least partially stripped from the nanoparticles by physical or chemical treatment. In some embodiments, the anisotropic conductive nanoparticles of the deposited non-conductive layer can alternatively be pre-coated with said non-conductive binder, resin or additive to render them non-conductive. Whether the non-conductive binder, resin or additive is precoated onto the anisotropic conductive nanoparticles or in included when depositing the non-conductive layer is a matter of choice.

Said non-conductive binder, resin or additive is selected to be capable of being removed under specified conditions to thereby regenerate conduction between the anisotropic conductive nanoparticles. For example, the non-conductive binder, resin or additive could be partially or fully stripped by irradiating the anisotropic conductive nanoparticles of the non-conductive layer. In some embodiments, the non-conductive binder, resin or additive can be partially or fully removed from the anisotropic conductive nanoparticles of the non-conductive layer by chemical treatment.

The patterned conductive layer could then, for example, be made by depositing the nonconductive layer and then irradiating specific areas of the non-conductive layer to thereby selectively strip the non-conductive binder, resin or additive from the anisotropic conductive nanoparticles within said area and thereby render them again conductive between said nanoparticles. Similarly, patterned conductive layer could, for example, be made by depositing the non-conductive layer and then chemically treating specific areas of the non-conductive layer to thereby selectively strip the non-conductive binder, resin or additive from the anisotropic conductive nanoparticles within said area and thereby render them again conductive between said nanoparticles.

In some embodiments this can be accomplished by first masking the non-conductive layer with either a stencil or photo-patterned polymer layer which will block the chemical or irradiation treatment and protect the non-conducive binder or additive to maintain a non-conductive state in those areas of the layer. The irradiation can, for example, be either UV light or electromagnetic radiation that renders the non-conductive regions conductive by removing, degrading, or de-activating the binder or additive that inhibits the conductivity between the anisotropic conductive nanoparticles to provide conduction in two or three dimensions of the layer. The irradiation can also happen, for example, by rastering a laser or electron beam to activate the anisotropic conductive nanoparticles and render the non-conductive layer conductive in those areas exposed to the rastering laser or electron beam.

Chemical treatments could be performed by, for example, dipping, coating, spraying or painting the layer. Chemical treatments could also, for example, be applied as a vapor.

Some non-limiting examples of binders, resins, or additives that inhibit conduction between nanoparticles include ultraviolet (UV) cured vinyl acrylates such as those based on trimethylolpropane triacrylate or dimethylsiloxanes. Some non-limiting examples of additives include surfactants such as cetyl trimethylammonium bromide and alkyl dithiothiadiazole. Some non-limiting examples of additives include nadic methyl anhydride, dicyandiamide, and similar molecules.

An advantage of preparing the patterned conductive layer by modification of a deposited non-conductive layer as described above is that in can be prepared from a single deposition as compared with multiple layer deposition steps.

Mixtures

In some embodiments, mixtures used to practice this invention can comprise; a) at least one alcohol solvent; b) at least one ester solvent; c) at least one cellulose ether therein solvated; and d) anisotropic conductive nanoparticles uniformly dispersed in said mixture. Said mixtures can be referred to more commonly as inks or conductive inks. Said mixtures or inks can produce films that when sufficiently thin can form transparent and/or conductive layers (or films) on all or part of one or more surfaces of a substrate.

In some embodiments, mixtures used to practice this invention can comprise; a) at least one alcohol solvent; b) at least one ketone solvent; c) at least one polar vinyl polymer therein solvated; and d) anisotropic conductive nanoparticles uniformly dispersed in said mixture. Said mixtures can be referred to more commonly as inks or conductive inks. Said mixtures or inks can produce films that can form transparent and/or conductive layers (or films) on all or part of one or more surfaces of a substrate.

In some embodiments, mixtures used to practice this invention can comprise; a) at least one aliphatic or aromatic solvent; b) at least one alcohol solvent; c) at least one apolar vinyl polymer therein solvated; and d) anisotropic conductive nanoparticles uniformly dispersed in said mixture. Said mixtures can be referred to more commonly as inks or conductive inks. Said mixtures or inks can produce films that can form transparent and/or conductive layers (or films) on all or part of one or more surfaces of a substrate.

In some embodiments, mixtures used to practice this invention can comprise; a) at least one alcohol solvent; b) water; c) at least one water soluble polymer therein solvated; and d) anisotropic conductive nanoparticles uniformly dispersed in said mixture. Said mixtures can be referred to more commonly as inks or conductive inks. Said mixtures or inks can produce films that can form transparent and/or conductive layers (or films) on all or part of one or more surfaces of a substrate.

It is to be understood that to be transparent, the conductive layers (or films) will be sufficiently thin to permit light to pass through. If the conductive layers are too thick, insufficient light will pass. The thickness of the conductive layer is therefore dependent on the exact light transmittance properties of the mixture.

In some embodiments, the mixtures of this invention may optionally comprise additives to enhance or control flowability, coatability, viscosity, uniformity of deposition or color of the resulting conductive layer. In some embodiments, the additives can alter the film formation properties, minimize film formation defects, increase strength as well as alter adhesion and/or hardness or affect the hydrophobic or hydrophilic properties of the surface. In some embodiments, the additives can alter flexibility of the resulting conductive layer. An example of an additive is a surfactant.

The components of said mixtures can generally be categorized as the liquid components and solid components. The alcohol, ester, ketone, aliphatic and aromatic solvents as well as water are liquid components. The cellulose ether, polar vinyl polymer, apolar vinyl polymer, water soluble polymer and anisotropic conductive nanoparticles are solid components. While the cellulose ether, polar vinyl polymer, apolar vinyl polymer, and water soluble polymer component will at least partially dissolve in the solvents of the mixture, the anisotropic conductive nanoparticles typically don't substantially dissolve (and are therefore suspended) in the mixture.

The conductive layer or transparent conductive layer formed from said mixtures is typically a dry film that is produced by evaporation of the solvent from said mixture. In some embodiments, it may be preferred to use the conductive layer while still liquid. When a solid or semi-solid conductive layer is desired, the conductive film can be produced by evaporation of the solvent. Evaporation of the solvent can occur at ambient temperature and/or pressure or can be accelerated by heating and/or vacuum evaporation. Evaporation of solvent from mixture that has been disposed onto the surface or surfaces of a substrate produces a conductive layer that is a network of anisotropic conductive nanoparticles that is at least partially encapsulated by the binder.

Applicants have determined that the conductive properties/quality of transparent conductive layers (a.k.a. transparent conductive films) can depend upon how uniformly dispersed the anisotropic conductive nanoparticles are in said mixture. Stated differently, if the anisotropic conductive nanoparticles tend to localize, clump or aggregate, the layer or film produced by applying the mixture to a substrate will not exhibit good conductivity. Without wishing to be bound to any theory, it is believed that when the anisotropic conductive nanoparticles localize, clump or aggregate, they do not (or are less likely to) form an interconnected network in the resulting layer or coating. Consequently, it is preferred that the anisotropic conductive nanoparticles are uniformly dispersed in the mixture—which generally will result in the anisotropic conductive nanoparticles being uniformly distributed in the resulting film.

Applicants' observations are supported by Examples 2, 3 and 4 and associated Tables II-IV. Tables II-IV in particular show that certain mixtures comprising solvent combinations found in some references results in aggregation of the anisotropic conductive nanoparticles in the mixture and the resulting films are poorly electrically conductive.

Taken together, the information provided in Examples 1-4 and Tables I-IV support Applicants' view that not all solvent and binder combinations will produce a conductive layer and indeed, certain combinations produce superior performance whilst others produce inferior performance. In particular, the mixtures described herein tend to be superior inks that produce superior conductive layers.

Simply stated, the selected solvents and the nature of the selected binder (e.g. cellulose ether, polar vinyl polymer, apolar vinyl polymer and water soluble polymer) combine to produce the superior performance properties. For example, Applicants have found that an alcohol solvent, ester solvent and cellulose ether (not cellulose ester) binder when combined with anisotropic conductive nanoparticles and mixed in the certain proportions can form highly conductive transparent layer (i.e. films). Applicants have also found that an alcohol solvent, ketone solvent and polar vinyl polymer binder when combined with anisotropic conductive nanoparticles and mixed in the certain proportions can form highly conductive transparent layer (i.e. films). Applicants have further found that an alcohol solvent, aliphatic solvent and apolar vinyl polymer binder when combined with anisotropic conductive nanoparticles and mixed in the certain proportions can form highly conductive transparent layer (i.e. films). Applicants have still further found that an alcohol solvent, water and water soluble binder when combined with anisotropic conductive nanoparticles and mixed in the certain proportions can form highly conductive transparent layer (i.e. films).

In some embodiments, the mixtures (inks) of this invention have a low enough viscosity that they can be used in ink jet printing and other printing technologies (flexo, gravure, offset). In some embodiments, the mixtures (inks) of this invention are more viscous and cannot be used in ink-jet printing but can be used for screen printing or other high viscosity printing methods.

Alcohol Solvent

As noted above, various mixtures of this invention can comprise at least one alcohol solvent. Alcohol solvents are known by Applicants to be very good at preventing the aggregation and/or clumping of anisotropic conductive nanoparticles (in particular—silver nanoparticles). Whilst numerous alcohol solvents and mixtures of alcohol solvents can be used, Applicants have found that methyl alcohol and isopropyl alcohol are particularly useful alcohol solvents for the practice of this invention.

Alcohol solvents, such as methanol and isopropanol also evaporate well at ambient temperatures. In general, alcohols that evaporate well at ambient temperature are preferred for the practice of this invention. For example, the alcohol solvent (or mixture of alcohol solvents) can be selected to have a boiling point that is less than 100° C., less than 90° C. or less than 80° C.

In some embodiments, the alcohol solvent is the largest component of the mixture by volume. The alcohol solvent can be up to 99.5% by volume of the mixture although it is typically much less than 99.5% by volume of the mixture. Generally the best performing inks comprise at least 70% by volume of one or more alcohol solvents. As observed in Tables II and III, mixtures with between 90% and 70% by volume alcohol solvent don't tend to exhibit any significant aggregation of the silver nanowires (i.e. the 'anisotropic conductive nanoparticles').

In some embodiments, the volume of alcohol solvent in the mixture can be less than 70% by volume. For example, in some embodiments, the alcohol solvent in the mixture can be from 60 to just below 70 percent by volume. In some embodiments, the alcohol solvent in the mixture can be from 50 to just below 60 percent by volume. In some embodiments, the alcohol solvent in the mixture can be from 40 to just below 50 percent by volume. In some embodiments, the alcohol solvent in the mixture can be from 30 to just below 40 percent by volume. Generally, the alcohol solvent is not less than 30 percent by volume of the mixture. In some embodiments, the alcohol solvent is not less than fifty percent by volume. In some embodiments, the alcohol solvent is not less than sixty percent by volume. In some embodiments, the alcohol solvent is present in the mixture in 50% or greater by volume.

In some embodiments, the alcohol solvent is present in the mixture from about 50 percent to about 95 percent by volume. In some embodiments, the alcohol solvent is present in the mixture from about 40 percent to about 98 percent by volume. In some embodiments, the alcohol solvent is present in the mixture from about 30 percent to about 99.5 percent by volume.

Ester Solvent

As noted above, various mixtures of this invention can comprise at least one ester solvent. Ester solvents have been shown by Applicants to be very good at dissolving the cellulose ether binder. Examples of ester solvents include but are not limited to methyl acetate, ethyl acetate, butyl acetate, and isopropyl acetate. Whilst numerous ester solvents and mixtures of ester solvents can be used, Applicants have found that methyl acetate and ethyl acetate are particularly useful ester solvents for the practice of this invention.

Ester solvents, such as methyl acetate and ethyl acetate also evaporate well at ambient temperatures. In general, ester solvents that evaporate well at ambient temperature are useful for the practice of this invention. For example, the ester solvent (or mixture of ester solvents) can be selected to have a boiling point that is less than 100° C., less than 90° C. or less than 80° C. In some cases, the alcohol and ester solvents can be selected to form a low boiling point azeotrope.

The ester solvent generally can be from about 0.5% by volume to about 70% by volume of the mixture. As shown in Table III mixtures with 30% or less by volume ester solvent don't tend to exhibit any significant aggregation of the silver nanowire (i.e. the 'anisotropic conductive nanoparticles').

TABLE III

| Sample | % IPA | % Methyl Acetate | Aggregation Score (5 is worst) | Surface Resistance (Ohm/sq) |
|---|---|---|---|---|
| 1-Useful | 90 | 10 | 0 | 51 |
| 2-Useful | 80 | 20 | 0 | 42 |
| 3-Useful | 70 | 30 | 0 | 43 |
| 4-Useful | 50 | 50 | 1 | 63 |
| 5-Useful | 40 | 60 | 1 | 243 |
| 6-Useful | 30 | 70 | 1 | 4250 |
| 7-Non Useful | 20 | 80 | 2 | non conductive |

In some embodiments, the volume of ester solvent in the mixture can be less than 70% by volume. For example, in some embodiments, the ester solvent in the mixture can be from 50 to just below 60 percent by volume. In some embodiments, the ester solvent in the mixture can be from 40 to just below 50 percent by volume. In some embodiments, the ester solvent in the mixture can be from 30 to just below 40 percent by volume. In some embodiments, the ester solvent in the mixture can be from 20 to just below 30 percent by volume. In some embodiments, the ester solvent in the mixture can be from 10 to just below percent by volume. In some embodiments, the ester solvent in the mixture can be from 0.5 to just below 10 percent by volume. Generally however, the ester solvent is not greater than 50 percent by volume of the mixture.

Ketone Solvent

As noted above, various mixtures of this invention comprise at least one ketone solvent. Ketone solvents have been shown by Applicants to be very good at dissolving the polar vinyl polymers. Examples of ketone solvents include but are not limited to acetone, methyl ethyl ketone, methyl propyl ketone, methyl isobutyl ketone, methyl isoamyl ketone, diacetone alcohol, methyl amyl ketone, cyclohexanone, di-isobutyl ketone and isoporone. Whilst numerous ketone solvents and mixtures of ketone solvents can be used, Applicants have found that acetone is a particularly useful ketone solvent for the practice of this invention.

Ketone solvents, such as acetone also evaporate well at ambient temperatures. In general, ketone solvents that evaporate well at ambient temperature are preferred for the practice of this invention. In some cases, the alcohol and ketone solvents can be selected to form a low boiling point azeotrope.

The ketone solvent generally can be from about 0.5% by volume to about 70% by volume of the mixture. As shown in Table III mixtures with 30% or less by volume ester solvent don't tend to exhibit any significant aggregation of the silver nanowire (i.e. the 'anisotropic conductive nanoparticles').

In some embodiments, the volume of ketone solvent in the mixture can be less than 70% by volume. For example, in some embodiments, the ketone solvent in the mixture can be from 50 to just below 60 percent by volume. In some embodiments, the ketone solvent in the mixture can be from 40 to just below 50 percent by volume. In some embodiments, the ketone solvent in the mixture can be from 30 to just below 40 percent by volume. In some embodiments, the ketone solvent in the mixture can be from 20 to just below 30 percent by volume. In some embodiments, the ketone solvent in the mixture can be from 10 to just below 20 percent by volume. In some embodiments, the ketone solvent in the mixture can be from about 0.5 to just below 10 percent by volume.

Aliphatic or Aromatic Solvent

As noted above, various mixtures of this invention comprise at least one aliphatic and/or aromatic solvent. Aliphatic and/or aromatic solvents have been shown by Applicants to be very good at dissolving the apolar vinyl polymers. Whilst numerous aliphatic or aromatic solvents and mixtures of aliphatic and aromatic solvents can be used, Applicants have found that cyclohexane and toluene are particularly useful aliphatic/aromatic solvents for the practice of this invention.

In some embodiments, the volume of aliphatic and/or aromatic solvent in the mixture can be less than 70% by volume. For example, in some embodiments, the aliphatic and/or aromatic solvent in the mixture can be from 50 to just below 60 percent by volume. In some embodiments, the aliphatic and/or aromatic solvent in the mixture can be from 40 to just below 50 percent by volume. In some embodiments, the aliphatic and/or aromatic solvent in the mixture can be from 30 to just below 40 percent by volume. In some embodiments, the aliphatic and/or aromatic solvent in the mixture can be from 20 to just below 30 percent by volume. In some embodiments, the aliphatic and/or aromatic solvent in the mixture can be from 10 to just below 20 percent by volume. In some embodiments, the aliphatic and/or aromatic solvent in the mixture can be from 0.5 to just below 10 percent by volume.

Water

As noted above, various mixtures of this invention can comprise water. In some embodiments, water in the mixture can be less than 70% by volume. For example, in some embodiments, water in the mixture can be from 50 to just below 60 percent by volume. In some embodiments, water in the mixture can be from 40 to just below 50 percent by volume. In some embodiments, water in the mixture can be from 30 to just below 40 percent by volume. In some embodiments, water in the mixture can be from 20 to just below 30 percent by volume. In some embodiments, water in the mixture can be from 10 to just below 20 percent by volume. In some embodiments, water in the mixture can be from 0.5 to just below 10 percent by volume.

Cellulose Ether

When described in the literature, conductive inks often are discussed with reference to inclusion of a binder. However, various literature references suggest that the binder can be optional. With respect to the present invention, in some embodiments the cellulose ether is a component of the mixture and can be referred to as a binder. In short, the binder is a compound that supports the network (or web or matrix) of interconnected anisotropic conductive nanoparticles that is left behind after the solvent of the mixture evaporates. For this example, the ethyl cellulose (alone or in combination with other binders) supports the network (or web or matrix) of interconnected anisotropic conductive nanoparticles that is left behind after the solvents of the mixture evaporate.

Examples of cellulose ethers that can be used in the practice of this invention include ethyl cellulose, methyl cellulose, hydroxyethyl cellulose, hydroxypropyl methyl cellulose, hydroxypropyl cellulose, or methyl 2-hydroxyethyl cellulose, and in particular, ethyl cellulose with an ethoxyl content between 40-60%.

Polar Vinyl Polymers

With respect to the present invention, in some embodiments a polar vinyl polymer is a component of the mixture and can be referred to as a binder. For this example, the polar vinyl polymer (alone or in combination with other binders) supports the network (or web or matrix) of interconnected anisotropic conductive nanoparticles that is left behind after the solvents of the mixture evaporate.

Examples of polar vinyl polymers that can be used in the practice of this invention include polyvinylpyrrolidone (PVP), polyvinylbutyral (PVB), polyvinylalcohol (PVA), polyvinylacetate and polyacrylic acid.

Apolar Vinyl Polymers

With respect to the present invention, in some embodiments a polar vinyl polymer is a component of the mixture and can be referred to as a binder. For this example, the apolar vinyl polymer (alone or in combination with other binders) supports the network (or web or matrix) of interconnected anisotropic conductive nanoparticles that is left behind after the solvents of the mixture evaporate.

Examples of apolar vinyl polymers that can be used in the practice of this invention include polyethylene, polypropylene, cyclic olefin polymer, polystyrene, polymethylmethacrylate, polyesters (polyethylene terephthalate, polybutylene terephthalate) and polyacrylonitrile.

Water Soluble Polymers

With respect to the present invention, in some embodiments a water soluble polymer is a component of the mixture and can be referred to as a binder. For this example, the water soluble polymer (alone or in combination with other binders) supports the network (or web or matrix) of interconnected anisotropic conductive nanoparticles that is left behind after the solvents of the mixture evaporate.

Examples of water soluble polymers that can be used in the practice of this invention include carboxymethyl cellulose, hydroxyethyl cellulose, hydroxypropyl methyl cellulose, methyl cellulose, polyvinyl alcohol (PVA), polystyrene sulfonate, polyallylamine, polyethyleneimine (PEI), poly(2-ethyl-2-oxazoline), polyethylene oxide, polyethlyene glycol, polyvinylpyrrolidone.

Anisotropic Conductive Nanoparticles

The anisotropic conductive nanoparticles form a network (i.e. a matrix or a web) in the conductive layer and thereby conduct the heat and/or electricity across or within the network. The anisotropic conductive nanoparticles can be metallic or non-metallic. For example both silver nanoparticles and carbon nanotubes are known to be both electrically and thermally conductive. Thus, in some embodiments, the anisotropic conductive nanoparticles can be metal nanowires, metal flakes, metal nanospheres, metal nanotubes, carbon nanotubes, graphene, or any possible combination thereof. If metal, the anisotropic conductive nanoparticles can be metal nanowires, metal flakes, metal nanospheres, metal nanotubes or combinations thereof. The metal can be silver, copper, nickel, gold, palladium, platinum or any possible combination thereof. Other types of conductive fillers like carbon black can be used. For purposes of this invention, graphite is not an anisotropic conductive nanoparticle.

The conductivity of the conductive layer can depend upon the amount of anisotropic conductive nanoparticles used in the mixture (ink). The amount of anisotropic conductive nanoparticles selected may depend on the application and/or printing method used for applying the mixture (ink) to the substrate. In some embodiments, the anisotropic conductive nanoparticles dispersed in the mixture are less than or equal to 0.25% by volume. In some embodiments, the anisotropic conductive nanoparticles dispersed in the mixture are less than or equal to 0.5% by volume. In some embodiments, the anisotropic conductive nanoparticles dispersed in the mixture are less than or equal to 1% by volume. In some embodiments, the anisotropic conductive nanoparticles dispersed in the mixture are less than or equal to 2% by volume. In some embodiments, the anisotropic conductive nanoparticles dispersed in the mixture are less than or equal to 3% by volume. In some embodiments, the anisotropic conductive nanoparticles dispersed in the mixture are less than or equal to 4% by volume. In some embodiments, the anisotropic conductive nanoparticles dispersed in the mixture are less than or equal to 5% by volume. In some embodiments, the anisotropic conductive nanoparticles dispersed in the mixture are less than or equal to 6% by volume. In some embodiments, the anisotropic conductive nanoparticles dispersed in the mixture are less than or equal to 7% by volume. In some embodiments, the anisotropic conductive nanoparticles dispersed in the mixture are less than or equal to 8% by volume. In some embodiments, the anisotropic conductive nanoparticles dispersed in the mixture are less than or equal to 9% by volume. In some embodiments, the anisotropic conductive nanoparticles dispersed in the mixture are less than or equal to 10% by volume. In some embodiments, the anisotropic conductive nanoparticles dispersed in the mixture are less than or equal to 11% by volume. In some embodiments, the anisotropic conductive nanoparticles dispersed in the mixture are less than or equal to 12% by volume. In some embodiments, the anisotropic conductive nanoparticles dispersed in the mixture are less than or equal to 13% by volume. In some embodiments, the anisotropic conductive nanoparticles dispersed in the mixture are less than or equal to 14% by volume. In some embodiments, the anisotropic conductive nanoparticles dispersed in the mixture are less than or equal to 15% by volume. In some embodiments, the anisotropic conductive nanoparticles dispersed in the mixture are less than or equal to 16% by volume. In some embodiments, the anisotropic conductive nanoparticles dispersed in the mixture are less than or equal to 17% by volume. In some embodiments, the anisotropic conductive nanoparticles dispersed in the mixture are less than or equal to 18% by volume. In some embodiments, the anisotropic conductive nanoparticles dispersed in the mixture are less than or equal to 19% by volume.

The amount of anisotropic conductive nanoparticles in the mixture can exceed 19% by volume. Indeed, in some embodiments the amount of anisotropic conductive nanoparticles in the mixture can be up to and including 35% by volume.

Similarly, the amount of anisotropic conductive nanoparticles in the mixture can be less than 0.25 percent by volume. Indeed, in some embodiments the amount of anisotropic conductive nanoparticles in the mixture can be 0.1 percent or lower.

In some embodiments, the anisotropic conductive nanoparticles comprise from about 0.1 percent to about 1 percent of the volume of the mixture. In some embodiments, the anisotropic conductive nanoparticles comprise from about 0.25 percent to about 10 percent of the volume of the mixture.

Solids in the Mixture

Solids are any solid materials used to produce the mixture. The anisotropic conductive nanoparticles and the cellulose ether, polar vinyl polymers, apolar vinyl polymers, and water soluble polymers are solids. In some embodiments, the mixture is prepared with reference to the amount of solids contained therein.

In some embodiments, solids in said mixture are from about 0.01 to about 80 weight percent of said mixture. In some embodiments, the solids are present in the range of about 0.5 to about 50 weight percent of the mixture. In some embodiments, the solids are present in the range of about 2 to about 30 weight percent of the mixture. In some embodiments, the solids are present in the range of about 1 to about 25 weight percent of the mixture.

In some embodiments, the solids are less than 2 weight percent of the mixture. In some embodiments, the solids are less than 5 weight percent of the mixture. In some embodiments, the solids are less than 10 weight percent of the mixture. In some embodiments, the solids are less than 15 weight percent of the mixture. In some embodiments, the solids are less than 20 weight percent of the mixture. In some embodiments, the solids are less than 25 weight percent of the mixture. In some embodiments, the solids are less than 30 weight percent of the mixture. In some embodiments, the solids are less than 35 weight percent of the mixture. In some embodiments, the solids are less than 40 weight percent of the mixture. In some embodiments, the solids are less than 45 weight percent of the mixture. In some embodiments, the solids are less than 50 weight percent of the mixture.

In some embodiments, the mixture is prepared with reference to a ratio of the amounts of anisotropic conductive nanoparticles to cellulose ether, polar vinyl polymers and apolar vinyl polymers. For example, in some embodiments, the ratio of weight of the anisotropic conductive nanoparticles to the cellulose ether, polar vinyl polymers and/or apolar vinyl polymers is in the range from about one part (by weight) anisotropic conductive nanoparticles to ten thousand parts (by weight) cellulose ether, polar vinyl polymers and/or apolar vinyl polymers. In some embodiments, the ratio of weight of the anisotropic conductive nanoparticles to the cellulose ether, polar vinyl polymers and/or apolar vinyl polymers is in the range from about ninety-five parts (by weight) anisotropic conductive nanoparticles to one part (by weight) cellulose ether, polar vinyl polymers and/or apolar vinyl polymers. Generally, the range for the ratio of the weight of the anisotropic conductive nanoparticles to the cellulose ether, polar vinyl polymers and/or apolar vinyl polymers is from about one part (by weight) anisotropic conductive nanoparticles to ten thousand parts (by weight) cellulose ether, polar vinyl polymers and/or apolar vinyl polymers to about ninety-five parts (by weight) anisotropic conductive nanoparticles to one part (by weight) cellulose ether, polar vinyl polymers and/or apolar vinyl polymers.

Forming the Conductive Layers

Materials comprising the conductive layer(s) or transparent conductive layer(s) are typically formed by: a) contacting the substrate with a mixture as described herein; and b) permitting the solvent of the mixture to evaporate to thereby form the conductive layer on the substrate. The coatings (i.e. films) of mixture on the substrate can be prepared using techniques known in the art as wire wound rod coating, dip coating, air knife coating, curtain coating, slide coating, slot-die coating, roll coating, gravure coating, or extrusion coating. One or more surfactants and other coating aids can be incorporated into the mixture to thereby improve the coating process.

Compositions

In some embodiments, this invention pertains to compositions comprising a conductive layer or transparent conductive layer disposed on at least part of at least one surface of a substrate. In general, said compositions are produced by contacting at least part of at least one surface of a substrate with a mixture as disclosed herein. In some embodiments, the composition does not require that the solvents of the mixture be evaporated. Said compositions are believed to be novel and non-obvious manufacturing intermediates to the final novel and non-obvious substrates comprising the conductive layers or transparent conductive layers wherein the solvent has been evaporated or substantially evaporated. In each case, the compositions are substrates that comprise at least one conductive layer or transparent conductive layer disposed thereon.

The final novel and non-obvious substrates comprising the conductive layer(s) and/or transparent conductive layers wherein the solvent has been evaporated or substantially evaporated can be used for applications such as touch panel displays, liquid crystal displays, electroluminescent lighting, organic light-emitting diodes, photovoltaic solar-cells, electro-thermal heating, defrosters, anti-fog, thermal interface materials, electrodes, lightning strike protection, EMI shielding, antistatic coatings and/or smart windows.

5. Various Embodiments of the Invention

It should be understood that the order of steps or order for performing certain actions is immaterial so long as the present teachings remain operable or unless otherwise specified. Moreover, in some embodiments, two or more steps or actions can be conducted simultaneously so long as the present teachings remain operable or unless otherwise specified.

In some embodiments, this invention pertains to a mixture comprising: a) at least one alcohol solvent; b) at least one ester solvent; c) at least one cellulose ether therein solvated; and d) anisotropic conductive nanoparticles uniformly dispersed in said mixture. In some embodiments, the alcohol solvent in the mixture is not less than thirty percent by volume. In some embodiments, the alcohol solvent in the mixture is not less than fifty percent by volume. In some embodiments, the alcohol solvent in the mixture is not less than sixty percent by volume. In some embodiments, the alcohol solvent in the mixture is not less than seventy percent by volume. In some embodiments, the alcohol solvent in the mixture is not less than eighty percent by volume. In some embodiments, the alcohol solvent in the mixture is not less than ninety percent by volume.

In some embodiments, this invention pertains to a method for preparing a substrate comprising a conductive layer (where, in some embodiments the layer is or can be made transparent), said method comprising: a) contacting at least part of at least one surface of said substrate with a mixture comprising: i) at least one alcohol solvent; ii) at least one ester solvent; iii) at least one cellulose ether therein solvated; and iv) anisotropic conductive nanoparticles uniformly dispersed in said mixture; and b) permitting said alcohol solvent and said ester solvent of said mixture to evaporate to thereby form a transparent conductive layer on said substrate. In some embodiments, the alcohol solvent in the mixture is not less than thirty percent by volume. In some embodiments, the alcohol solvent in the mixture is not less than forty percent by volume. In some embodiments, the alcohol solvent in the mixture is not less than fifty percent by volume. In some embodiments, the alcohol solvent in the mixture is not less than sixty percent by volume. In some embodiments, the alcohol solvent in the mixture is not less than seventy percent by volume. In some embodiments, the alcohol solvent in the mixture is not less than eighty percent by volume. In some embodiments, the alcohol solvent in the mixture is not less than ninety percent by volume In some embodiments, the mixture can further comprise a conductive polymer.

In some embodiments, this invention pertains to a composition formed by: a) contacting at least part of at least one surface of a substrate with a mixture comprising: i) at least one alcohol solvent; ii) at least one ester solvent; iii) at least one cellulose ether therein solvated; and iv) anisotropic conductive nanoparticles uniformly dispersed in said mixture; and b) permitting said alcohol solvent and said ester solvent of said mixture to evaporate to thereby form a conductive layer on said substrate. In some embodiments, the alcohol solvent in the mixture is not less than thirty percent by volume. In some embodiments, the alcohol solvent in the mixture is not less than forty percent by volume. In some embodiments, the alcohol solvent in the mixture is not less than fifty percent by volume. In some embodiments, the alcohol solvent in the mixture is not less than sixty percent by volume. In some embodiments, the alcohol solvent in the mixture is not less than seventy percent by volume. In some embodiments, the alcohol solvent in the mixture is not less than eighty percent by volume. In some embodiments, the alcohol solvent in the mixture is not less than ninety percent by volume.

In some embodiments, the mixture used to form the composition can further comprise a conductive polymer.

In some embodiments, the anisotropic conductive nanoparticles are metal nanowires, metal flakes, metal nanospheres, metal nanotubes, carbon nanotubes, graphene, or any possible combination thereof. In some embodiments, said metal nanowires, metal flakes, metal nanospheres and metal nanotubes comprise a metal selected from the group consisting of: silver, copper, nickel, gold, palladium, platinum and any possible combination thereof. The anisotropic conductive nanoparticles can be silver nanowires. Other conductive fillers can include carbon black.

In some embodiments, this invention pertains to a composition comprising: a substrate with a liquid mixture applied thereto to thereby form a substantially uniform coating on at least part of at least one surface of said substrate, wherein said mixture comprises: i) at least one alcohol solvent; ii) at least one ester solvent; iii) at least one cellulose ether therein solvated; and iv) anisotropic conductive nanoparticles uniformly dispersed in said mixture. In some embodiments, the alcohol solvent in said mixture is not less than thirty percent by volume. In some embodiments, the alcohol solvent in the mixture is not less than forty percent by volume. In some embodiments, the alcohol solvent in the mixture is not less than fifty percent by volume. In some embodiments, the alcohol solvent in the mixture is not less than sixty percent by volume. In some embodiments, the alcohol solvent in the mixture is not less than seventy percent by volume. In some embodiments, the alcohol solvent in the mixture is not less than eighty percent by volume. In some embodiments, the alcohol solvent in the mixture is not less than ninety percent by volume.

In some embodiments, this invention pertains to a composition comprising: a) a substrate; and b) a conductive layer disposed on at least part of at least one surface of said substrate; wherein said conductive layer comprises: i) cellulose ether; and ii) an electrically and/or thermally conductive network of anisotropic conductive nanoparticles at least partially encapsulated within (or dispersed within) said cellulose ether. In some embodiments, the anisotropic conductive nanoparticles are silver nanowires. In some embodiments, the conductive layer is transparent.

In some embodiments, this invention pertains to a mixture comprising: a) at least one alcohol solvent; b) at least one ketone solvent; c) at least one polar vinyl polymer therein solvated; and d) anisotropic conductive nanoparticles uniformly dispersed in said mixture. In some embodiments, the alcohol solvent in the mixture is not less than forty percent by volume. In some embodiments, the alcohol solvent in the mixture is not less than fifty percent by volume. In some embodiments, the alcohol solvent in the mixture is not less than sixty percent by volume. In some embodiments, the alcohol solvent in the mixture is not less than seventy percent by volume. In some embodiments, the alcohol solvent in the mixture is not less than eighty percent by volume. In some embodiments, the alcohol solvent in the mixture is not less than ninety percent by volume.

In some embodiments, this invention pertains to a method for preparing a substrate comprising a conductive layer, said method comprising: a) contacting at least part of at least one surface of said substrate with a mixture comprising: i) at least one alcohol solvent; ii) at least one ketone solvent; iii) at least one polar vinyl polymer therein solvated; and iv) anisotropic conductive nanoparticles uniformly dispersed on said mixture; and b) permitting said alcohol solvent and said ketone solvent of said mixture to evaporate to thereby form a transparent conductive layer on said substrate. In some embodiments, the alcohol solvent in the mixture is not less than forty percent by volume. In some embodiments, the alcohol solvent in the mixture is not less than fifty percent by volume. In some embodiments, the alcohol solvent in the mixture is not less than sixty percent by volume. In some embodiments, the alcohol solvent in the mixture is not less than seventy percent by volume. In some embodiments, the alcohol solvent in the mixture is not less than eighty percent by volume. In some embodiments, the alcohol solvent in the mixture is not less than ninety percent by volume. In some embodiments, the conductive layer is transparent. In some embodiments, the substrate is transparent.

In some embodiments, this invention pertains to a composition formed by: a) contacting at least part of at least one surface of a substrate with a mixture comprising: i) at least one alcohol solvent; ii) at least one ketone solvent; iii) at least one polar vinyl polymer therein solvated; and iv) anisotropic conductive nanoparticles uniformly dispersed on said mixture; and b) permitting said alcohol solvent and said ketone solvent of said mixture to evaporate to thereby form a conductive layer on said substrate. In some embodiments, the alcohol solvent in the mixture is not less than forty percent by volume. In some embodiments, the alcohol solvent in the mixture is not less than fifty percent by volume. In some embodiments, the alcohol solvent in the mixture is not less than sixty percent by volume. In some embodiments, the alcohol solvent in the mixture is not less than seventy percent by volume. In some embodiments, the alcohol solvent in the mixture is not less than eighty percent by volume. In some embodiments, the alcohol solvent in the mixture is not less than ninety percent by volume. In some embodiments, the conductive layer is transparent. In some embodiments, the substrate is transparent.

In some embodiments, the anisotropic conductive nanoparticles are metal nanowires, metal flakes, metal nanospheres, metal nanotubes, carbon nanotubes, graphene, or any possible combination thereof. In some embodiments, said metal nanowires, metal flakes, metal nanospheres and metal nanotubes comprise a metal selected from the group consisting of: silver, copper, nickel, gold, palladium, platinum and any possible combination thereof. The anisotropic conductive nanoparticles can be silver nanowires.

In some embodiments, this invention pertains to a composition comprising: a substrate with a liquid mixture applied thereto to thereby form a substantially uniform coating on at least part of at least one surface of said substrate, wherein said mixture comprises: i) at least one alcohol solvent; ii) at least one ketone solvent; iii) at least one polar vinyl polymer therein solvated; and iv) anisotropic conductive nanoparticles uniformly dispersed on said mixture. In some embodiments, the alcohol solvent in said mixture is not less than forty percent by volume. In some embodiments, the coating is transparent. In some embodiments, the substrate is transparent.

In some embodiments, this invention pertains to a composition comprising: a) a substrate; and b) a conductive layer disposed on at least part of at least one surface of said substrate; wherein said conductive layer comprises: i) one polar vinyl polymer; and ii) an electrically and/or thermally conductive network of anisotropic conductive nanoparticles at least partially encapsulated within said one polar vinyl polymer. In some embodiments, the anisotropic conductive nanoparticles are silver nanowires. In some embodiments, the conductive layer is transparent. In some embodiments, the substrate is transparent.

In some embodiments, this invention pertains to a mixture comprising: a) at least one alcohol solvent; b) water; c) at least one water soluble polymer therein solvated; and d) anisotropic conductive nanoparticles uniformly dispersed in said mixture. In some embodiments, the alcohol solvent in the mixture is not less than thirty percent by volume. In some embodiments, the alcohol solvent in the mixture is not more than fifty percent by volume.

In some embodiments, this invention pertains to a method for preparing a substrate comprising a conductive layer, said method comprising: a) contacting at least part of at least one surface of said substrate with a mixture comprising: i) at least one alcohol solvent; ii) water; iii) at least one water soluble polymer therein solvated; and iv) anisotropic conductive nanoparticles uniformly dispersed on said mixture; and b) permitting said alcohol solvent and water of said mixture to evaporate to thereby form a conductive layer on said substrate. In some embodiments, the conductive layer is transparent. In some embodiments, the substrate is transparent. In some embodiments, the alcohol solvent in the mixture is not more than thirty percent by volume.

In some embodiments, this invention pertains to a composition formed by: a) contacting at least part of at least one surface of a substrate with a mixture comprising: i) at least one alcohol solvent; ii) water; iii) at least one water soluble polymer therein solvated; and iv) anisotropic conductive nanoparticles uniformly dispersed on said mixture; and b) permitting said alcohol solvent and water of said mixture to evaporate to thereby form a conductive layer on said substrate. In some embodiments, the conductive layer is transparent. In some embodiments, the substrate is transparent. In some embodiments, the alcohol solvent in the mixture is not more than fifty percent by volume.

In some embodiments, the anisotropic conductive nanoparticles are metal nanowires, metal flakes, metal nanospheres, metal nanotubes, carbon nanotubes, graphene, or any possible combination thereof. In some embodiments, said metal nanowires, metal flakes, metal nanospheres and metal nanotubes comprise a metal selected from the group consisting of: silver, copper, nickel, gold, palladium, platinum and any possible combination thereof. The anisotropic conductive nanoparticles can be silver nanowires.

In some embodiments, this invention pertains to a composition comprising: a substrate with a liquid mixture applied thereto to thereby form a substantially uniform coating on at least part of at least one surface of said substrate, wherein said mixture comprises: i) at least one alcohol solvent; ii) water; iii) at least one water soluble polymer therein solvated; and iv) anisotropic conductive nanoparticles uniformly dispersed on said mixture. In some embodiments, the alcohol solvent in said mixture is not more than fifty percent by volume.

In some embodiments, this invention pertains to a composition comprising: a) a substrate; and b) a conductive layer disposed on at least part of at least one surface of said substrate; wherein said conductive layer comprises: i) water soluble polymer; and ii) an electrically and/or thermally conductive network of anisotropic conductive nanoparticles at least partially encapsulated within said one water soluble polymer. In some embodiments, the conductive layer is transparent. In some embodiments, the substrate is transparent. In some embodiments, the anisotropic conductive nanoparticles are silver nanowires.

In some embodiments, this invention pertains to a mixture comprising: a) at least one aliphatic or aromatic solvent; b) at least one apolar vinyl polymer therein solvated; c) at least one surfactant and d) anisotropic conductive nanoparticles uniformly dispersed in said mixture.

In some embodiments, this invention pertains to a method for preparing a substrate comprising a conductive layer, said method comprising: a) contacting at least part of at least one surface of said substrate with a mixture comprising: i) at least one aliphatic or aromatic solvent; ii) at least one apolar vinyl polymer therein solvated; iii) at least one surfactant and iv) anisotropic conductive nanoparticles uniformly dispersed on said mixture; and b) permitting said aliphatic or aromatic solvent of said mixture to evaporate to thereby form a conductive layer on said substrate. In some embodiments, the conductive layer is transparent. In some embodiments, the substrate is transparent.

In some embodiments, this invention pertains to a composition formed by: a) contacting at least part of at least one surface of a substrate with a mixture comprising: i) at least one aliphatic or aromatic solvent; ii) at least one apolar vinyl polymer therein solvated; iii) at least one surfactant and iv) anisotropic conductive nanoparticles uniformly dispersed in said mixture; and b) permitting said aliphatic or aromatic solvent of said mixture to evaporate to thereby form a conductive layer on said substrate. In some embodiments, the conductive layer is transparent. In some embodiments, the substrate is transparent.

In some embodiments, the anisotropic conductive nanoparticles are metal nanowires, metal flakes, metal nanospheres, metal nanotubes, carbon nanotubes, graphene, or any possible combination thereof. In some embodiments, said metal nanowires, metal flakes, metal nanospheres and metal nanotubes comprise a metal selected from the group consisting of: silver, copper, nickel, gold, palladium, platinum and any possible combination thereof. The anisotropic conductive nanoparticles can be silver nanowires.

In some embodiments, this invention pertains to a composition comprising: a substrate with a liquid mixture applied thereto to thereby form a substantially uniform coating on at least part of at least one surface of said substrate, wherein said mixture comprises: i) at least one aliphatic or aromatic solvent; ii) at least one apolar vinyl polymer therein solvated; iii) at least one surfactant and iv) anisotropic conductive nanoparticles uniformly dispersed on said mixture. In some embodiments, the coating is transparent. In some embodiments, the substrate is transparent.

In some embodiments, this invention pertains to a composition comprising: a) a substrate; and b) a conductive layer disposed on at least part of at least one surface of said substrate; wherein said conductive layer comprises: i) one apolar vinyl polymer; and ii) an electrically and/or thermally conductive network of anisotropic conductive nanoparticles at least partially encapsulated within said one apolar vinyl polymer. In some embodiments, the conductive layer is transparent. In some embodiments, the substrate is transparent. In some embodiments, the anisotropic conductive nanoparticles are silver nanowires.

6. Examples

Aspects of the present teachings can be further understood in light of the following examples, which should not be construed as limiting the scope of the present teachings in any way.

Example 1

For this example, the substrate was glass. Mixtures comprising binder (no polymer control, ester cellulose and ethyl cellulose), silver nanowires and a solvent comprising alcohol and methyl acetate were applied to the substrate.

The conductivity and transparency were measured for each sample. The data shown in Table I demonstrate that selective solvent mixtures are required to prepare high performance transparent conducting silver nanowire films. The silver nanowires were prepared at Seashell Technology and the binders and solvents obtained from Sigma-Aldrich or Dow Chemical.

TABLE I

| Sample | Polymer | Surface Resistance (Ohm/sq) | % Transmission* (550 nm) |
|---|---|---|---|
| 1-Useful | Ethyl cellulose | 212 | 87.7 |
| 2-Non Useful | Ester cellulose | polymer unstable | not measured |

Example 2

For this experiment, the properties of a mixture of silver nanowires in various solvents were compared. In particular, the propensity of the silver nanowires to aggregate was examined.

The silver nanowires were diluted from a 100% isopropyl alcohol stock suspension to a final concentration of 0.1 weight percent in the different types of organic solvents listed in Table II. These organic solvents contained 0.5 weight percent Ethocel Standard 10 (ethylcellulose EC10). Consequently, the final mixtures representing each sample comprised silver nanowires, alcohol, EC10 and solvent. Samples were allowed to stand for 5 minutes and transferred to a glass slide. Dark field optical microscopy was used to capture images of the nanowire distribution in each solvent. The slides were inspected using microscopy and the amount of nanowire aggregates (defined as high light scattering bundles of multiple nanowires) were scored for each sample and the recorded finding is shown in Table II. Aggregation level was defined as no detectable aggregates (0), 1-4 aggregates per field (1) or more that 4 aggregates per field (2). The nanowires initially dispersed in 100% IPA were monodisperse and showed no evidence of aggregation. The solvent systems used in samples 2 and 3 were those described in references for transparent conductor preparation where the binder was a cellulose ester (i.e. US2011/0232945, WO2011/115603, WO2011/008226). The solvent percentages are based on volume percent. The conditions used in samples 4 and were selected to represent common solvent systems at various alcohol to non-alcohol solvent ratios.

The data shown in Table II suggests that the silver nanowires tend to form aggregates in all mixtures except for sample 1 and 6 where the solvents are isopropyl alcohol or methanol and methyl acetate.

Example 3

For this example, samples were prepared essentially as described in Example 2 except that for this example only isopropyl alcohol (IPA) and methyl acetate were used as solvents to form the mixture. In particular, a series of mixtures was prepared where the percent by volume of methyl acetate and IPA was varied was varied by increments of 10 percent by volume. The inks were cast into films and the films were visually inspected for the presence of silver nanowire aggregates. Surface resistance and silver nanowire aggregation was measured for each sample and the results are shown in Table III.

With reference to Table III, it is apparent that aggregation is not observed in mixtures that contain up to 30% methyl acetate by volume (70% IPA). Similarly, the films (conductive layers) produced by applying these mixtures to a glass substrate exhibit very good electric conductivity. While some minimal aggregation of the silver nanowires was observed with the mixtures that contained 50 volume percent methyl acetate and 60 volume percent methyl acetate, the resulting films still exhibited fairly good electric conductivity. When the concentration of methyl acetate increase to 70 percent by volume or above, the resulting conductive layer exhibited very little or no electric conductivity. Consequently, the best transparent conductive layers (minimal nanowire aggregates with low surface resistance) were formed when the volume percent of IPA is 40% or greater.

Example 4

For this example, the substrate was a glass microscope slide. Mixtures comprising binder (ethyl cellulose, ester cellulose, methyl cellulose, polyvinylbutyral, polyvinylpyrrolidone, polystyrene, polymethylmethacrylate), silver nanowires and the different solvent combinations as shown in Table IV were applied to the substrate. The conductivity and transparency were measured for samples in which the solvent system had completely and homogenously solvated the binder. The data in Table IV demonstrate that selective solvent mixtures are required to prepare high performance transparent conducting films. The silver nanowires were prepared at Seashell Technology and the binders and solvents obtained from Sigma-Aldrich or Dow Chemical.

7. REFERENCES

U.S. Pat. No. 7,062,848 to Pan et al.
U.S. Pat. No. 7,097,788 to Kilkor et al.
U.S. Pat. No. 7,727,578 to Guiheen et al.
WO 2007/022226 to Alden et al.
US 2008/0292979 to Ding et al.
US 2009/0283304 to Winoto, Adrian
US 2009/0223703 to Winoto, Adrian
WO 2011/008229 to Zhou, Chaofeng While the present teachings are described in conjunction with various embodiments, it is not intended that the present teachings be limited to such embodiments. On the contrary, the present teachings encompass various alternatives, modifications and equivalents, as will be appreciated by those of skill in the art.

The invention claimed is:

1. A method of forming a patterned conductive layer, the method comprising:
    depositing a non-conductive layer on a substrate, wherein anisotropic conductive nanoparticles are deposited with a non-conductive additive that inhibits conduction between the anisotropic conductive nanoparticles; and
    partially stripping the non-conductive additive from the nanoparticles by a physical or chemical treatment.

2. The method according to claim 1, further comprising:
    a) contacting at least part of at least one surface of the substrate with a mixture comprising
        i) at least one alcohol solvent,
        ii) at least one ester solvent,
        iii) at least one cellulose ether therein solvated,
        iv) the anisotropic conductive nanoparticles uniformly dispersed in the mixture, and v) the non-conductive additive that inhibits conduction between the anisotropic conductive nanoparticles; and b) permitting the alcohol solvent and the ester solvent of the mixture to evaporate to thereby form a non-conductive layer on the substrate.

3. The method according to claim 2, wherein the anisotropic conductive nanoparticles of the mixture comprise a non-conductive additive coating that inhibits conduction between the anisotropic conductive nanoparticles.

4. The method according to claim 3, wherein the anisotropic conductive nanoparticles are deposited with an additive capable of adhering to the surface of the nanoparticles and shielding the nanoparticles from conductively interacting with other nanoparticles, and the additive is also capable of being at least partially stripped from the anisotropic conductive nanoparticles by the physical or chemical treatment.

5. The method according to claim 3, wherein the anisotropic conducting particles are deposited with an additive capable of being partially or fully stripped by irradiating the anisotropic conductive nanoparticles of the non-conductive layer.

6. The method according to claim 3, wherein the anisotropic conducting particles are deposited with an additive capable of being partially or fully removed from the anisotropic conductive nanoparticles of the non-conductive layer by chemical treatment.

7. The method according to claim 3, further comprising: irradiating specific areas of the nonconductive layer to thereby selectively strip the non-conductive additive from the anisotropic conductive nanoparticles within the specific areas, and thereby render the specific areas conductive between the nanoparticles.

8. The method according to claim 3, further comprising: chemically treating specific areas of the non-conductive layer to thereby selectively strip the non-conductive additive from the anisotropic conductive nanoparticles within the specific areas, and thereby render the specific areas conductive between said nanoparticles.

9. The method according to claim 8, wherein the chemically treating occurs by dipping, coating, spraying or painting the non-conductive layer or by applying a chemical treatment as a vapor.

10. The method according to claim 3, wherein the anisotropic conductive nanoparticles are deposited with at least one additive selected from the group consisting of a UV-cured vinyl acrylate, a dimethylsiloxane cetyl trimethylammonium bromide, an alkyl dithiothiadiazole, a nadic methyl anhydride and a dicyandiamide.

11. The method according to claim 1, wherein the anisotropic conductive nanoparticles are deposited with an additive capable of adhering to the surface of the nanoparticles and shielding the nanoparticles from conductively interacting with other nanoparticles, and the additive is also capable of being at least partially stripped from the anisotropic conductive nanoparticles by the physical or chemical treatment.

12. The method according to claim 1, wherein the anisotropic conducting particles are deposited with an additive capable of being partially or fully stripped by irradiating the anisotropic conductive nanoparticles of the non-conductive layer.

13. The method according to claim 1, wherein the anisotropic conducting particles are deposited with an additive capable of being partially or fully removed from the anisotropic conductive nanoparticles of the non-conductive layer by chemical treatment.

14. The method according to claim 1, further comprising: irradiating specific areas of the nonconductive layer to thereby selectively strip the non-conductive additive from the anisotropic conductive nanoparticles within the specific areas, and thereby render the specific areas conductive between the nanoparticles.

15. The method according to claim 14, wherein, prior to the irradiating, areas of the nonconductive layer are masked with either a stencil or photo-patterned polymer layer which blocks the irradiating and protects the non-conductive additive to maintain a non-conductive state in the areas of the nonconductive layer.

16. The method according to claim 15, wherein the irradiating occurs with UV light radiation.

17. The method according to claim 14, wherein the irradiating occurs with UV light radiation.

18. The method according to claim 14, wherein the irradiating is applied with a rastering laser or an electron beam.

19. The method according to claim 1, further comprising: chemically treating specific areas of the non-conductive layer to thereby selectively strip the non-conductive additive from the anisotropic conductive nanoparticles within the specific areas, and thereby render the specific areas conductive between said nanoparticles.

20. The method according to claim 19, wherein the chemically treating occurs by dipping, coating, spraying or painting the non-conductive layer or by applying a chemical treatment as a vapor.

21. The method according to claim 19, wherein, prior to the chemically treating, areas of the nonconductive layer are masked with either a stencil or photo-patterned polymer layer which blocks the chemically treating and protects the non-conductive additive to maintain a non-conductive state in the areas of the nonconductive layer.

22. The method according to claim 1, wherein the anisotropic conductive nanoparticles are deposited with at least one additive selected from the group consisting of a UV-cured vinyl acrylate, a dimethylsiloxane cetyl trimethylammonium bromide, an alkyl dithiothiadiazole, a nadic methyl anhydride and a dicyandiamide.

* * * * *